United States Patent
Peng et al.

(10) Patent No.: US 11,112,553 B2
(45) Date of Patent: Sep. 7, 2021

(54) LIGHT SOURCE MODULE AND DISPLAY DEVICE USING THE SAME

(71) Applicant: Coretronic Corporation, Hsin-Chu (TW)

(72) Inventors: Yi-Hsing Peng, Hsin-Chu (TW); Wen-Chun Wang, Hsin-Chu (TW); Chung-Yang Fang, Hsin-Chu (TW); Chih-Jen Tsang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 31 days.

(21) Appl. No.: 16/882,782

(22) Filed: May 26, 2020

(65) Prior Publication Data

US 2020/0284965 A1    Sep. 10, 2020

Related U.S. Application Data

(63) Continuation-in-part of application No. 16/388,883, filed on Apr. 19, 2019, now abandoned.

(30) Foreign Application Priority Data

Apr. 26, 2018 (CN) .......................... 201810384717.9

(51) Int. Cl.
*G02F 1/1335* (2006.01)
*F21V 8/00* (2006.01)
(Continued)

(52) U.S. Cl.
CPC ......... *G02B 6/005* (2013.01); *G02F 1/13458* (2013.01); *G02F 1/133345* (2013.01);
(Continued)

(58) Field of Classification Search
CPC ............ G02F 1/133536; G02F 1/1336; G02F 1/13306; G02F 1/133528; G02F 2001/133601; G09G 2300/0413
See application file for complete search history.

(56) References Cited

U.S. PATENT DOCUMENTS

2004/0125256 A1\* 7/2004 Park .................. G02F 1/136213
349/43
2013/0057806 A1   3/2013 Kanemitsu et al.
(Continued)

FOREIGN PATENT DOCUMENTS

| CN | 101354873 A | 1/2009 |
| TW | 201514778 A | 4/2015 |
| TW | 201545033 A | 12/2015 |

*Primary Examiner* — Mariam Qureshi

(57) ABSTRACT

A light source module includes an optical plate, a light source and a dimming liquid crystal panel. The dimming liquid crystal panel includes a first driving substrate, a second driving substrate and a liquid crystal material layer. The first driving substrate includes a first substrate and a common electrode. The second driving substrate includes a second substrate, independent electrodes, first signal pads, first wires, dummy wires and a transparent insulation layer. The first wires and dummy wires are disposed on the second substrate and covered by the transparent insulation layer, the first wires are exposed from the transparent insulation layer, the independent electrodes are insulated from each other, disposed on the transparent insulation layer and overlap the first wires and the dummy wires, and each independent electrode is electrically connected to one first signal pad via one first wire. A display device having the light source module is also provided.

16 Claims, 18 Drawing Sheets

(51) Int. Cl.
*G02F 1/1343* (2006.01)
*G02F 1/1333* (2006.01)
*G02F 1/1345* (2006.01)

(52) U.S. Cl.
CPC .. *G02F 1/133504* (2013.01); *G02F 1/133528* (2013.01); *G02F 1/134336* (2013.01); *G02F 1/133562* (2021.01); *G02F 1/134345* (2021.01); *G02F 2201/121* (2013.01)

(56) References Cited

U.S. PATENT DOCUMENTS

| | | | |
|---|---|---|---|
| 2016/0231497 A1* | 8/2016 | Kato | G02F 1/1336 |
| 2017/0343866 A1* | 11/2017 | Nam | G02F 1/134309 |
| 2018/0218703 A1* | 8/2018 | Lee | G02F 1/136286 |
| 2018/0231836 A1* | 8/2018 | Suzuki | G02F 1/1343 |
| 2018/0341132 A1 | 11/2018 | Suzuki | |
| 2019/0317346 A1 | 10/2019 | Montgomery et al. | |

* cited by examiner

LIGHT SOURCE MODULE AND DISPLAY DEVICE USING THE SAME

CROSS-REFERENCE TO RELATED APPLICATION

The present application is a continuation-in-part application claiming benefit from parent U.S. patent Application bearing a Ser. No. 16/388,883 and filed Apr. 19, 2019, which claims benefit from a China Application (CN201810384717.9 filed on 2018 Apr. 26), contents of which are incorporated herein for reference.

FIELD OF THE INVENTION

The invention relates to a light source module and its application, and more particularly to a light source module that can achieve local dimming and reduce the thickness of a backlight module, and a display device using the light source module.

BACKGROUND OF THE INVENTION

The liquid crystal display device controls the brightness of image by illuminating the liquid crystal display panel with the backlight module. In order to enhance the contrast of the liquid crystal display device, the most commonly method is to use a backlight module having a local dimming function. The local dimming technology adjusts the brightness of light emitting diodes (LEDs) in different areas by mainly using a direct-type backlight module to achieve the function of local dimming.

In general, the local dimming technology of direct-type backlight module needs to balance between the thickness of the backlight module and the number of LEDs. The larger the number of LEDs, the shorter the light mixing distance, and the thinner the thickness of the backlight module; but the larger the number of LEDs, the higher the cost of the backlight module.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a light source module that uses the configuration of a dimming liquid crystal panel to achieve local dimming.

The invention provides a display device that enhances the contrast of a display screen by the local dimming of the light source module.

Other objectives and advantages of the invention can be further understood from the technical features disclosed by the invention.

In order to achieve one or partial or all of the above objectives or other objectives, a light source module provided by an embodiment of the invention includes an optical plate, a light source and a dimming liquid crystal panel. The optical plate has a light incident surface and a light exit surface. The light source is disposed beside the light incident surface. The dimming liquid crystal panel is disposed opposite to the light exit surface and includes a first driving substrate, a second driving substrate and a liquid crystal material layer disposed between the first driving substrate and the second driving substrate. The first driving substrate includes a first substrate and a common electrode disposed on the first substrate. The second driving substrate includes a second substrate, a plurality of independent electrodes, a plurality of first signal pads, a plurality of first wires, a plurality of dummy wires and a first transparent insulation layer, wherein the first wires and the dummy wires are disposed on the second substrate and covered by the first transparent insulation layer, the first wires are further exposed from the first transparent insulation layer, the independent electrodes are insulated from each other and disposed on the first transparent insulation layer, the independent electrodes overlap the first wires and the dummy wires, the first signal pads are disposed on at least one side of the second substrate, and each of the independent electrodes is electrically connected to one of the first signal pads via one of the first wires.

In order to achieve one or partial or all of the above objectives or other objectives, a display device provided by an embodiment of the invention includes a display panel and the above-mentioned light source module. The light source module includes an optical plate, a light source and a dimming liquid crystal panel. The display panel is disposed on a side of the dimming liquid crystal panel away from the optical plate.

The light source module of the embodiment of the invention disposes the dimming liquid crystal panel on the light exit surface of the optical plate. The dimming liquid crystal panel has a plurality of partition areas due to the arrangement and disposition of the independent electrodes. Each of the independent electrodes is connected to the first signal pad through the first wire, and each of the independent electrodes receives a driving signal via the single first wire and the single first signal pad. According to the driving signal, the light transmittance of each of the partition areas can be controlled independently, thereby achieving local dimming. In the display device of the embodiment of the invention, by selecting the light transmittance in different areas of the light source module, the contrast of the display screen of the display panel can be enhanced.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
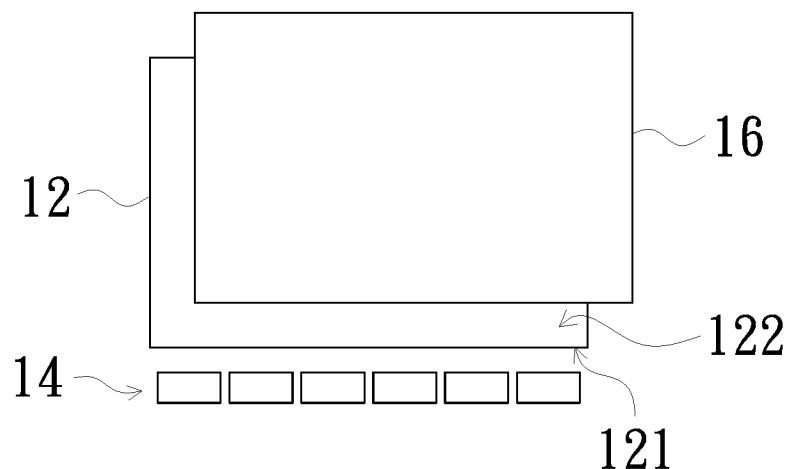
FIG. 1 is a schematic structural view of a light source module according to an embodiment of the invention.
Figure 2:
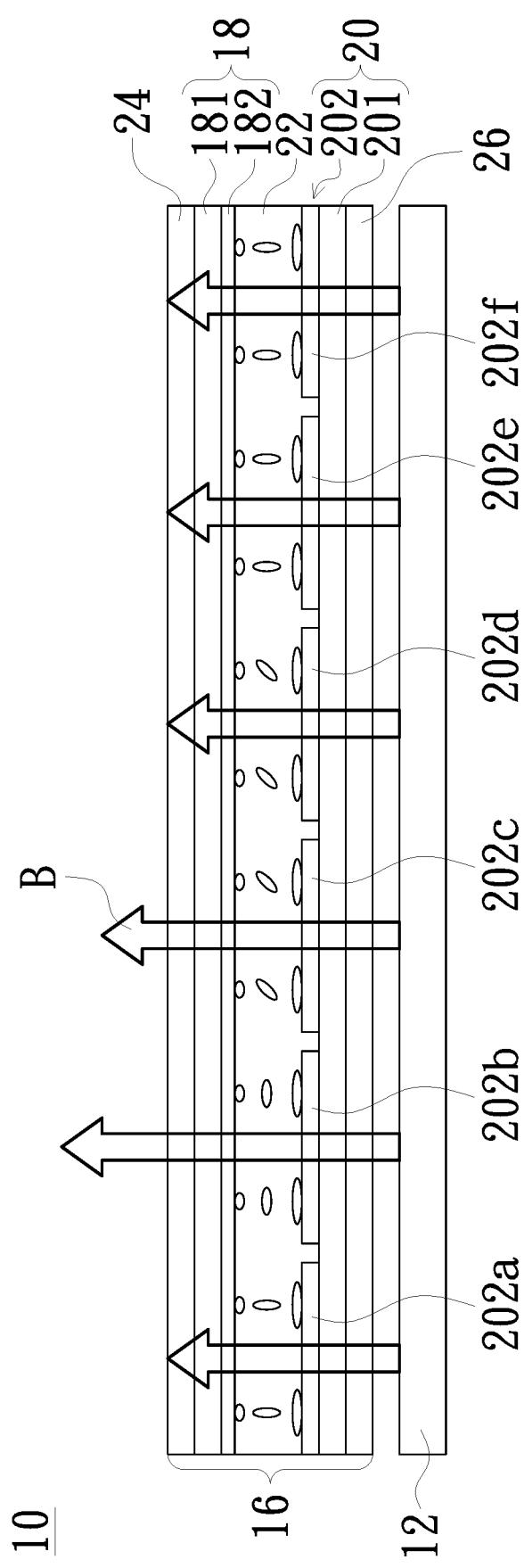
FIG. 2 is a schematic cross-sectional structural view of an optical plate and a dimming liquid crystal panel of a light source module according to an embodiment of the invention.

FIG. 1 is a schematic structural view of a light source module according to an embodiment of the invention. As shown in the figure, a light source module 10 includes an optical plate 12, a light source 14 and a dimming liquid crystal panel 16. The optical plate 12 of the embodiment is, for example, a light guide plate having a light incident surface 121 and a light exit surface 122. The light source 14 is disposed beside the light incident surface 121. The dimming liquid crystal panel 16 is disposed on the light exit surface 122 of the optical plate 12 and is disposed opposite to the light exit surface 122 of the optical plate 12. The invention does not limit the type of the optical plate 12 and its relative position to the light source 14. In other embodiments, the light source 14 can also be disposed below the optical plate 12. FIG. 2 is a schematic cross-sectional structural view of an optical plate and a dimming liquid crystal panel of a light source module according to an embodiment of the invention. Please also refer to FIG. 2, the dimming liquid crystal panel 16 includes a first driving substrate 18, a second driving substrate 20 and a liquid crystal material layer 22. The liquid crystal material layer 22 is disposed between the first driving substrate 18 and the second driving substrate 20. The liquid crystal alignment mode of the liquid crystal material layer 22 can comprises twisted nematic (TN), super twisted nematic (STN), vertical alignment (VA) or in-plane switching (IPS).

Figure 3A:
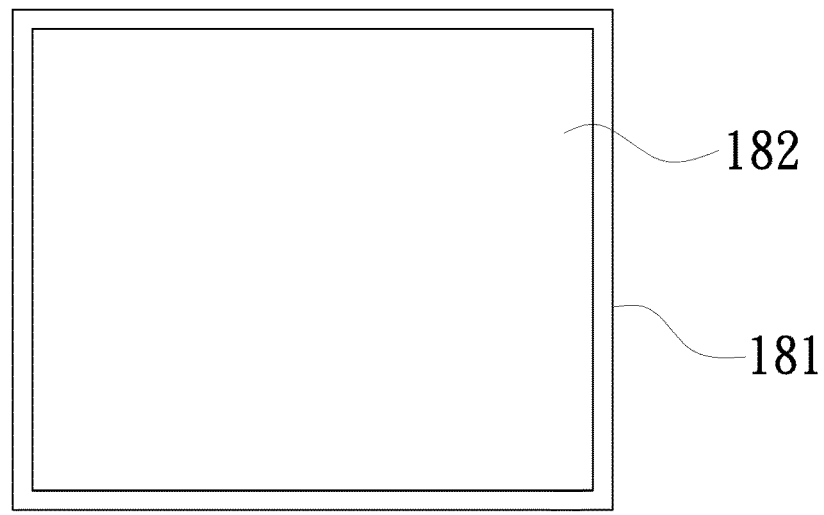
FIGS. 3A and 3B are respectively schematic structural views of a first driving substrate and a second driving substrate according to an embodiment of the invention.
Figure 3B:
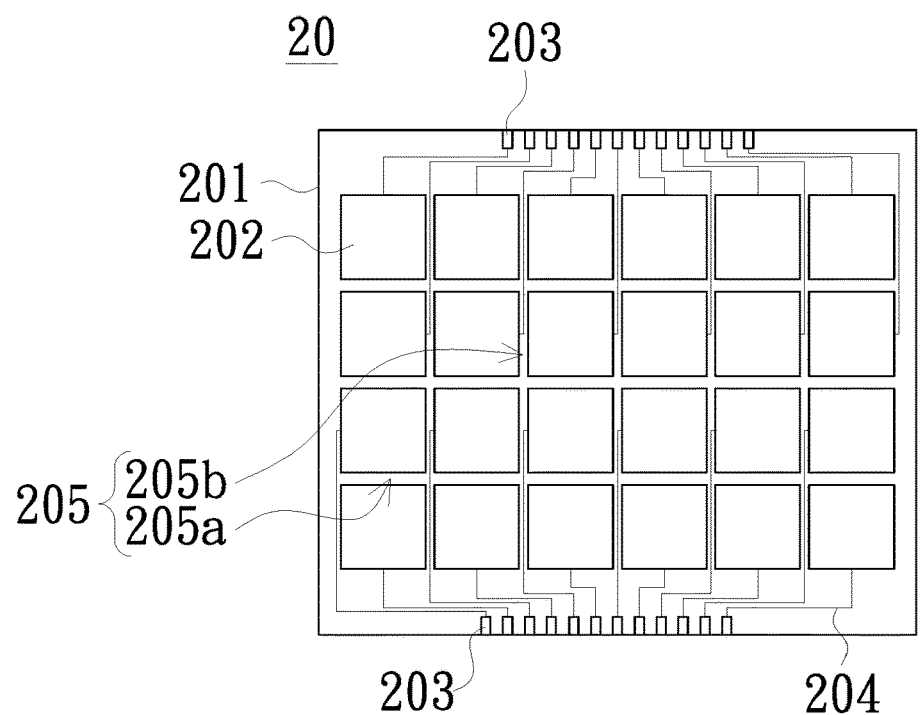

FIGS. 3A and 3B are respectively schematic structural views of a first driving substrate and a second driving substrate according to an embodiment of the invention. Please refer to FIGS. 2 and 3A, the first driving substrate 18 includes a first substrate 181 and a common electrode 182. The common electrode 182 is disposed between the first substrate 181 and the liquid crystal material layer 22. In an embodiment, the common electrode 182 is disposed on an inner surface (not numbered) of the first substrate 181 facing the liquid crystal material layer 22. Please refer to FIGS. 2 and 3B, the second driving substrate 20 includes a second substrate 201, a plurality of independent electrodes 202, a plurality of first signal pads 203 and a plurality of first wires 204. The independent electrodes 202, the first signal pads 203 and the first wires 204 are disposed between the second substrate 201 and the liquid crystal material layer 22, wherein the independent electrodes 202 are insulated from each other, and the first signal pads 203 are located outside the range of the liquid crystal material layer 22. In the embodiment, the first signal pads 203 are disposed on at least one side of the second substrate 201, and each of the independent electrodes 202 is electrically connected to one of the first signal pads 203 (single signal pad) by one of the first wires 204 (single wire), wherein the first wires 204 are insulated from each other. In an embodiment, the independent electrodes 202, the first signal pads 203 and the first wires 204 are disposed on an inner surface (not numbered) of the second substrate 201 facing the liquid crystal material layer 22.

Following the above description, as shown in FIG. 2, the dimming liquid crystal panel 16 of the light source module 10 further includes, for example, a first polarizer 24 and a second polarizer 26. The first driving substrate 18, the liquid crystal material layer 22 and the second driving substrate 20 are disposed between the first polarizer 24 and the second polarizer 26, wherein the first substrate 181 is located between the first polarizer 24 and the liquid crystal material layer 22, and the second substrate 201 is located between the second polarizer 26 and the liquid crystal material layer 22. In an embodiment, the first polarizer 24 includes at least one of a first absorption-type polarizing layer and a first reflection-type polarizing layer, and the second polarizer 26 includes at least one of a second absorption-type polarizing layer and a second reflection-type polarizing layer. Specifically, the first polarizer 24 and the second polarizer 26 can be an absorption-type polarizing layer, a reflection-type polarizing layer, or a stack of both, wherein the reflection-type polarizing layer is, for example, an advanced polarization conversion film (APCF) or a dual brightness enhancement film (DBEF).

The independent electrodes 202 are arranged in a matrix for example, and there are channels 205 between two adjacent rows of the independent electrodes 202 and between two adjacent columns of the independent electrodes 202. The channels 205 are, for example, a plurality of transverse channels 205a and a plurality of longitudinal channels 205b orthogonally arranged in a checkerboard pattern, as shown in FIG. 3B. In an embodiment, the longitudinal channel 205b is also formed between the independent electrode 202 adjacent to an edge (for example, the short side) of the second substrate 201 and the edge (for example, the short side) of the second substrate 201. The first signal pads 203 are, for example, disposed on opposite sides of an inner surface of the second substrate 201. By taking that the first signal pads 203 are disposed on two long sides of the second substrate 201 as an example, each of the first wires 204 is connected to each of the independent electrodes 202 from the first signal pads 203 along the longitudinal channels 205b parallel to the short sides of the second substrate 201, wherein each line (the first signal pad 203—the first wire 204—the independent electrode 202) is an independent connection, that is, the two adjacent lines are insulated. Since the first signal pads 203 are disposed on the opposite long sides of the second substrate 201, compared to the design of concentrating the first signal pads 203 on one side of the second substrate 201, the number of the first wires 204 on one side can be reduced by half, so that the number of the first wires 204 passing between each of the longitudinal channels 205b can be reduced, which can help to reduce the width of the longitudinal channels 205b, and also make the first wires 204 less noticeable. In the embodiment, each of the longitudinal channels 205b only needs one first wire 204 to pass therethrough at most.

In the embodiment, the materials of the independent electrodes 202, the first wires 204 and the first signal pads 203 are, for example, all transparent conductive materials, so that the manufacture of the independent electrodes 202, the first wires 204 and the first signal pads 203 can be completed in the same manufacturing process. In another embodiment, the material of the independent electrodes 202 is a transparent conductive material, and the materials of the first signal pads 203 and the first wires 204 are metal materials.

Figure 3C:
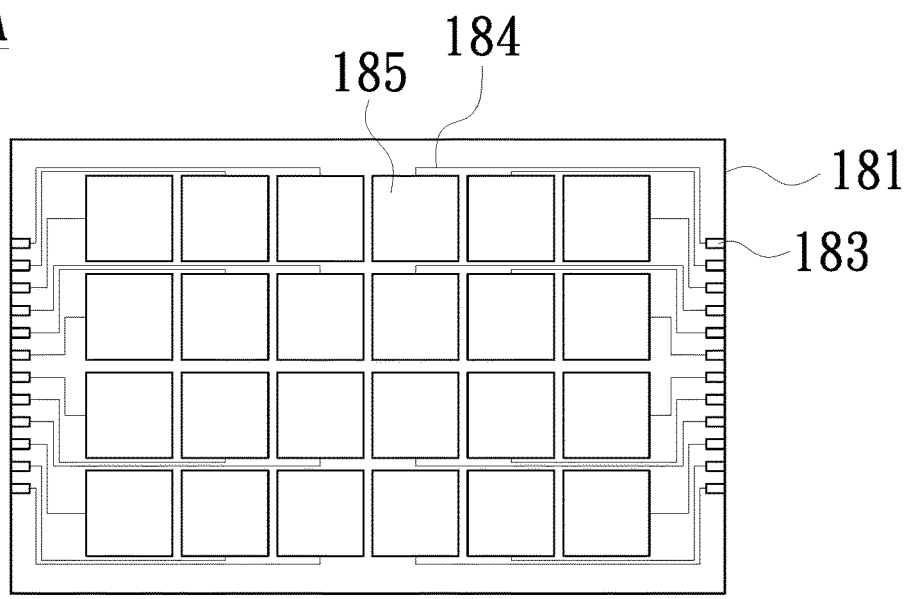
FIG. 3C is a schematic structural view of a first driving substrate according to another embodiment of the invention.

In addition to a full-chip design, the common electrode 182 of the first driving substrate 18 can also includes a plurality of independent sub-electrodes. FIG. 3C is a schematic structural view of a first driving substrate according to another embodiment of the invention. As shown in FIG. 3C, the first driving substrate 18A includes a first substrate 181, a plurality of independent sub-electrodes 185, a plurality of second signal pads 183, and a plurality of second wires 184. The independent sub-electrodes 185, the second signal pads 183 and the second wires 184 are disposed between the first substrate 181 and the liquid crystal material layer 22 (shown in FIG. 2). In an embodiment, the independent sub-electrodes 185, the second signal pads 183 and the second wires 184 are disposed on the inner surface (not numbered) of the first substrate 181 facing the liquid crystal material layer 22. The independent sub-electrodes 185 are insulated from each other, and the independent sub-electrodes 185 respectively correspond to the independent electrodes 202 of the second driving substrate 20. The second signal pads 183 are disposed on at least one side of the first substrate 181 and located outside the range of the liquid crystal material layer 22. In an embodiment, the first signal pads 203 are disposed on the opposite long sides of the second substrate 201, and the second signal pads 183 are, for example, disposed on opposite short sides of the first substrate 181. Each of the independent sub-electrodes 185 is electrically connected to one of the second signal pads 183 (single signal pad) by one of the second wires 184 (single wire), wherein the second wires 184 are insulated from each other. In the embodiment, the dimming liquid crystal panel 16 controls the light transmittance brightness of the area corresponding to the independent electrode (or the independent sub-electrode) on the dimming liquid crystal panel 16 by simultaneously controlling the voltages of the corresponding independent electrode 202 and the independent sub-electrodes 185.

Figure 4:
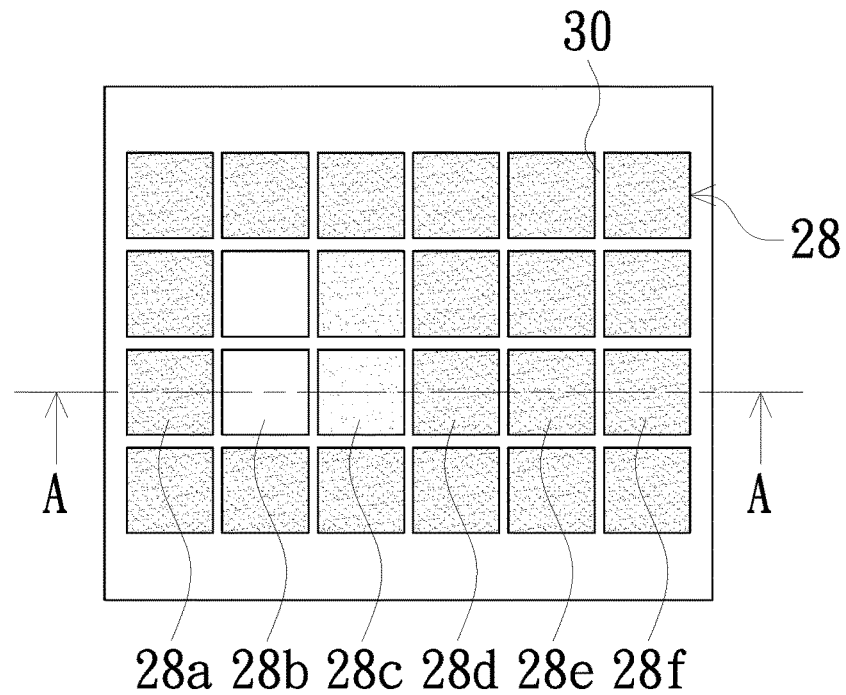
FIG. 4 is a schematic perspective top view of a light source module according to an embodiment of the invention.

Please refer to FIG. 4, which is a perspective top view of a light source module according to an embodiment of the invention. The above-mentioned FIG. 2 is a cross-sectional view taken along line A-A of FIG. 4. As shown in FIG. 4, corresponding to the matrix arrangement of the independent electrodes 202, the dimming liquid crystal panel 16 has matrix-arranged partition areas 28. Please refer to FIGS. 2 and 4, each of the partition areas 28 corresponds to one independent electrode 202. The first signal pad 203 receives a driving signal. The driving signal is transmitted to the independent electrode 202 via the first wire 204. The independent electrode 202 controls the alignment direction of the liquid crystal molecules of the liquid crystal material layer 22 according to the magnitude of the voltage applied by the driving signal. In this way, each of the partition areas 28 can control the penetration rate of light (light transmittance) via the driving signal respectively. Taking FIG. 2 as an example, the common electrode 182 is applied with a voltage V1; the independent electrode 202a, the independent electrode 202d, the independent electrode 202e and the independent electrode 202f are applied with a voltage V2; the independent electrode 202b is applied with the voltage V1; the independent electrode 202c is applied with a voltage V3; and the voltage V1, the voltage V2 and the voltage V3 are different. In FIG. 2, the state of light transmittance of the partition areas 28 corresponding to the independent electrodes 202 to which different voltages are applied is indicated by an arrow B. Please refer to FIG. 4 at the same time, the partition areas 28 indicate the lightness of brightness by the degree of density of the dots, the most sparse or no dots indicates the brightest (i.e., the highest light transmittance), and the densest dots indicate the darkest (i.e., the lowest light transmittance). In an embodiment, in the partition areas 28 arranged along the A-A segment, the light transmittance of the partition area 28b corresponding to the independent electrode 202b is the highest, the light transmittance of the partition area 28c corresponding to the independent electrode 202c is the second highest, and the partition areas 28a, 28d, 28e and 28f corresponding to the independent electrodes 202a, 202d, 202e and 202f are opaque, for example, black display.

Figure 5:
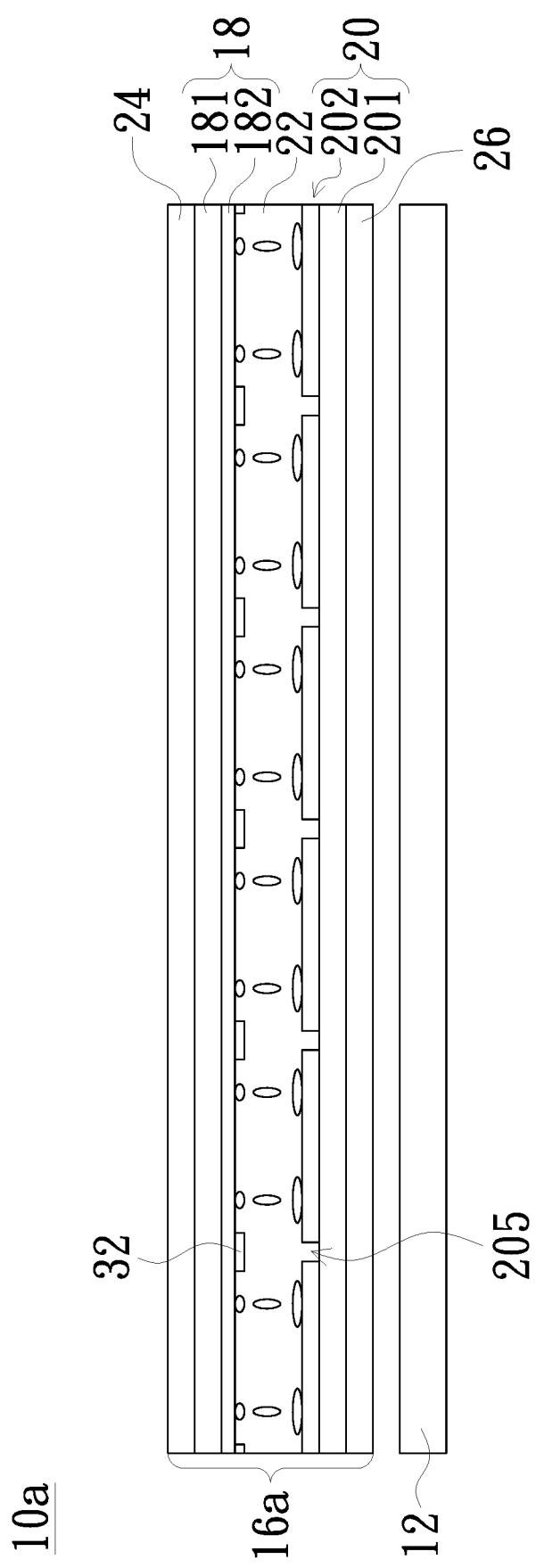
FIG. 5 is a schematic cross-sectional structural view of an optical plate and a dimming liquid crystal panel of a light source module according to another embodiment of the invention.

In an embodiment, since the channels 205 are disposed between the independent electrodes 202 of the dimming liquid crystal panel 16, the liquid crystal molecules of the liquid crystal material layer 22 at the channels 205 cannot be controlled. When the dimming liquid crystal panel 16 is in a normal white mode, if each of the partition areas 28 is controlled to have a low light transmittance, for example, black display, then a gap 30 between two partition areas 28 will transmit light. The position of the gap 30 corresponds to the channel 205 between the independent electrodes 202, thus, the light transmittance of the gap 30 causes bright grid lines to appear on the screen of the dimming liquid crystal panel 16. In order to shield light leakage, FIG. 5 is a schematic cross-sectional structural view of an optical plate and a dimming liquid crystal panel of a light source module according to another embodiment of the invention. The difference between the light source module shown in FIG. 5 and FIG. 2 lies in the light source module 10a illustrated in FIG. 5. The dimming liquid crystal panel 16a further includes a light shielding pattern layer 32. The light shielding pattern layer 32 is disposed on the common electrode 182 of the first driving substrate 18 and faces the second driving substrate 20. The light shielding pattern layer 32 corresponds to between the two adjacent independent electrodes 202. For example, the light shielding pattern layer 32 corresponds to the channel 205 between the independent electrodes 202, or slightly exceeds the width of the channel 205. In an embodiment, if the channels 205 are in a checkerboard pattern, the light shielding pattern layer 32 is also in a checkerboard pattern. Therefore, the light leakage phenomenon can be effectively reduced by setting the light shielding pattern layer 32.

In the above embodiment, the light shielding pattern layer 32 is disposed on the common electrode 182, but is not limited thereto. In the unillustrated drawings, the light shielding pattern layer 32 may also be disposed between the two adjacent independent electrodes 202 of the second driving substrate 20. In addition, if the dimming liquid crystal panel 16 is in a normal black mode, then the liquid crystal molecules of the liquid crystal material layer 22 at the channels 205 between the independent electrodes 202 are not controlled by the electric field. If each of the partition areas 28 is controlled to be low light transmittance, the gap 30 between two partition areas 28 will be in an opaque state. Therefore, the dimming liquid crystal panel 16 does not need to be disposed with the light shielding pattern layer 32.

Figure 6:
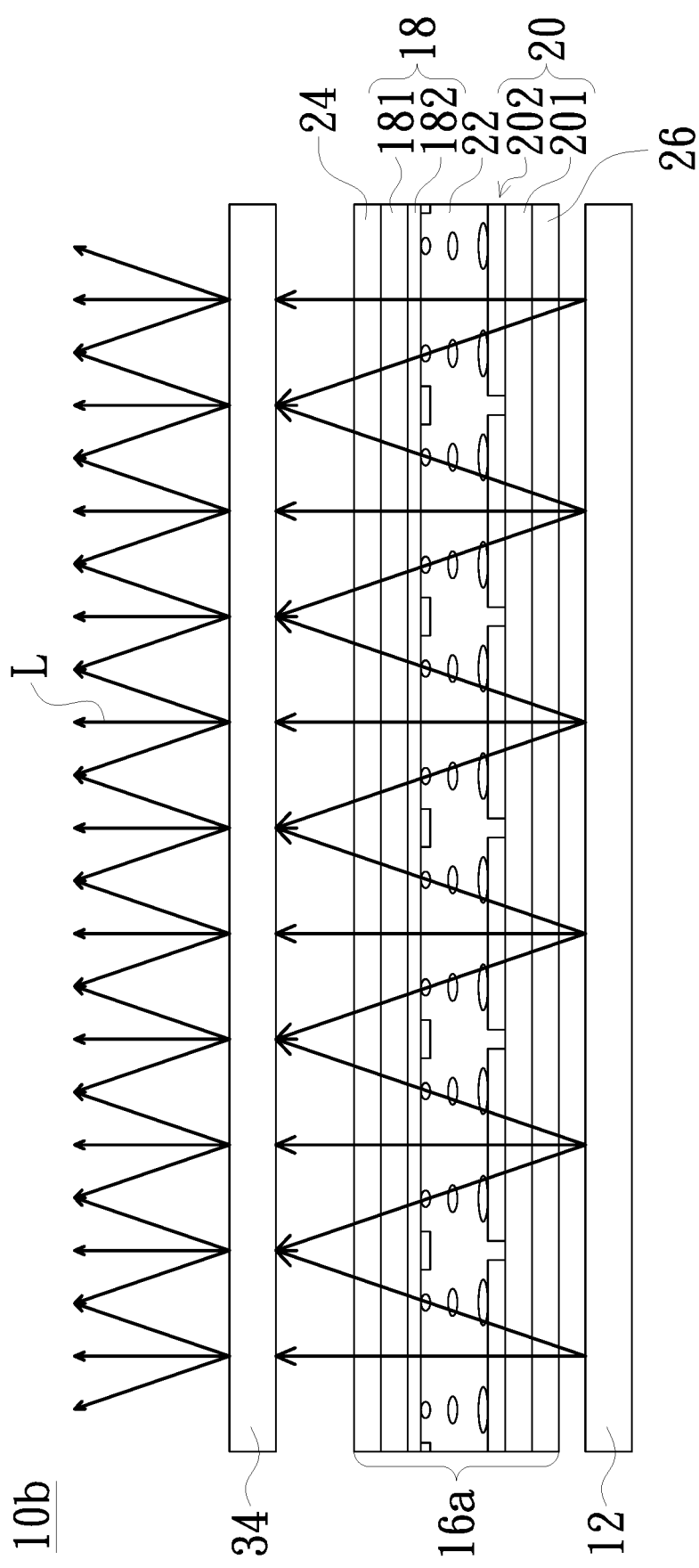
FIG. 6 is a schematic cross-sectional structural view of an optical plate and a dimming liquid crystal panel of a light source module according to another embodiment of the invention.

An embodiment in which the dimming liquid crystal panel 16a is disposed with the light shielding pattern layer 32 will be described below. When each of the partition areas 28 is controlled to have a high light transmittance, the setting of the light shielding pattern layer 32 will cause the gaps 30 between the partition areas 28 to be opaque and black grid lines will appear. In order to improve the problem, FIG. 6 is a schematic cross-sectional structural view of an optical plate and a dimming liquid crystal panel of a light source module according to another embodiment of the invention. The difference between the light source module shown in FIG. 6 and FIG. 5 lies in that the light source module 10b illustrated in FIG. 6 further includes a diffusion plate 34. The diffusion plate 34 is disposed at the side of the dimming liquid crystal panel 16a away from the optical plate 12. As shown in FIG. 6, the diffusion plate 34 can scatter the light L above the black grid lines area of the dimming liquid crystal panel 16a to obscure the black grid lines. In an embodiment, the diffusion plate 34 is preferably selected to have a low complex refractive index. For example, the material of the diffusion plate 34 comprises polycarbonate (PC), cyclic olefin polymer (COP), cyclic olefin copolymer (COC) or polymethyl methacrylate (PMMA). In an embodiment, the surface of the diffusion plate 34 has an embossed pattern.

Figure 7:
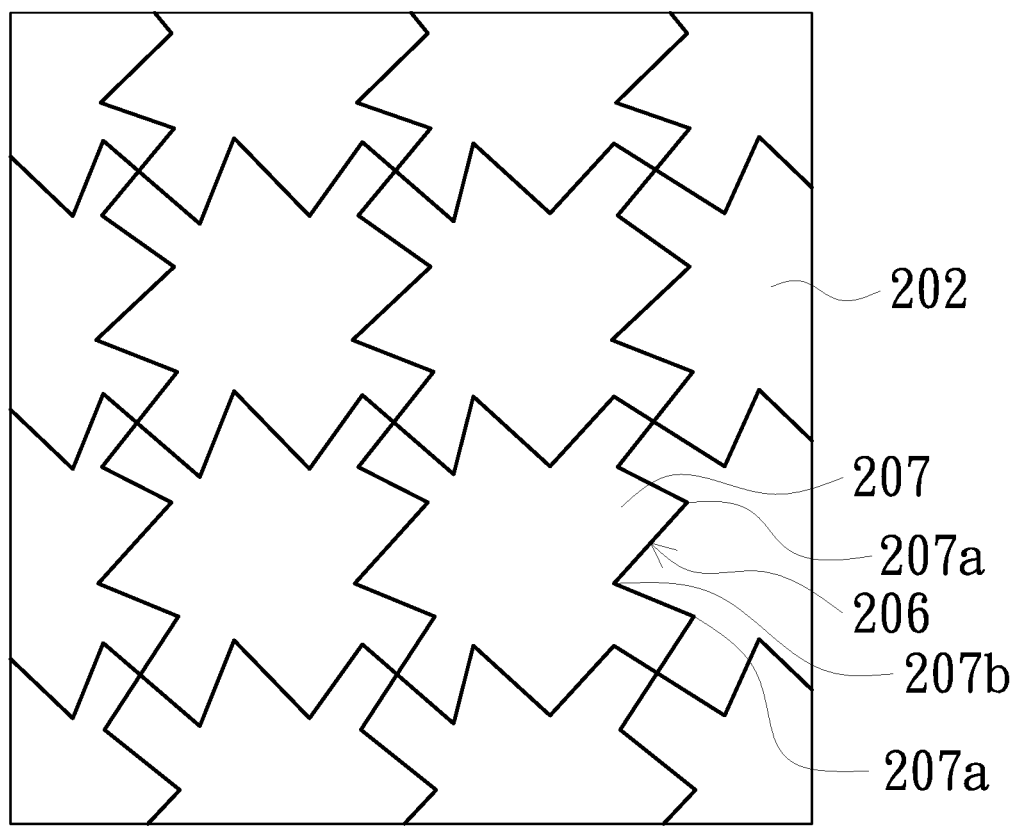
FIG. 7 is a schematic structural view of a plurality of independent electrodes according to another embodiment of the invention.

On the other hand, although the diffusion plate 34 can obscure the black grid lines between the partition areas 28, it may be necessary to use a diffusion plate 34 with high haze. The use of such high-haze diffusion plate 34 tends to reduce the luminance of the light source module 10b. Therefore, another way to obscure the black grid lines is by changing the edge structure of the independent electrodes 202. FIG. 7 is a schematic structural view of a plurality of independent electrodes according to another embodiment of the invention. As shown in the figure, the edge of each of the independent electrodes 202 is an indented structure 206, wherein the indented structure 206 includes a plurality of connected indented portions 207. In an embodiment, the height between a tooth peak 207a and a tooth valley 207b of each of the indented portions 207 is less than 100 microns, and the distance between the two adjacent tooth peaks 207a is less than 100 microns. Compared to regular lines, irregular lines are not easily identified, and therefore, changing the edges of the independent electrodes 202 to the indented structure 206 will further obscure the black grid lines. Due to the indented structure 206 of the edges of the independent electrodes 202, the luminance of the gap 30 of the two partition areas 28 (shown in FIG. 4) of the dimming liquid crystal panel 16 changes gradually, and thus the displayed image is more natural.

Figure 8:
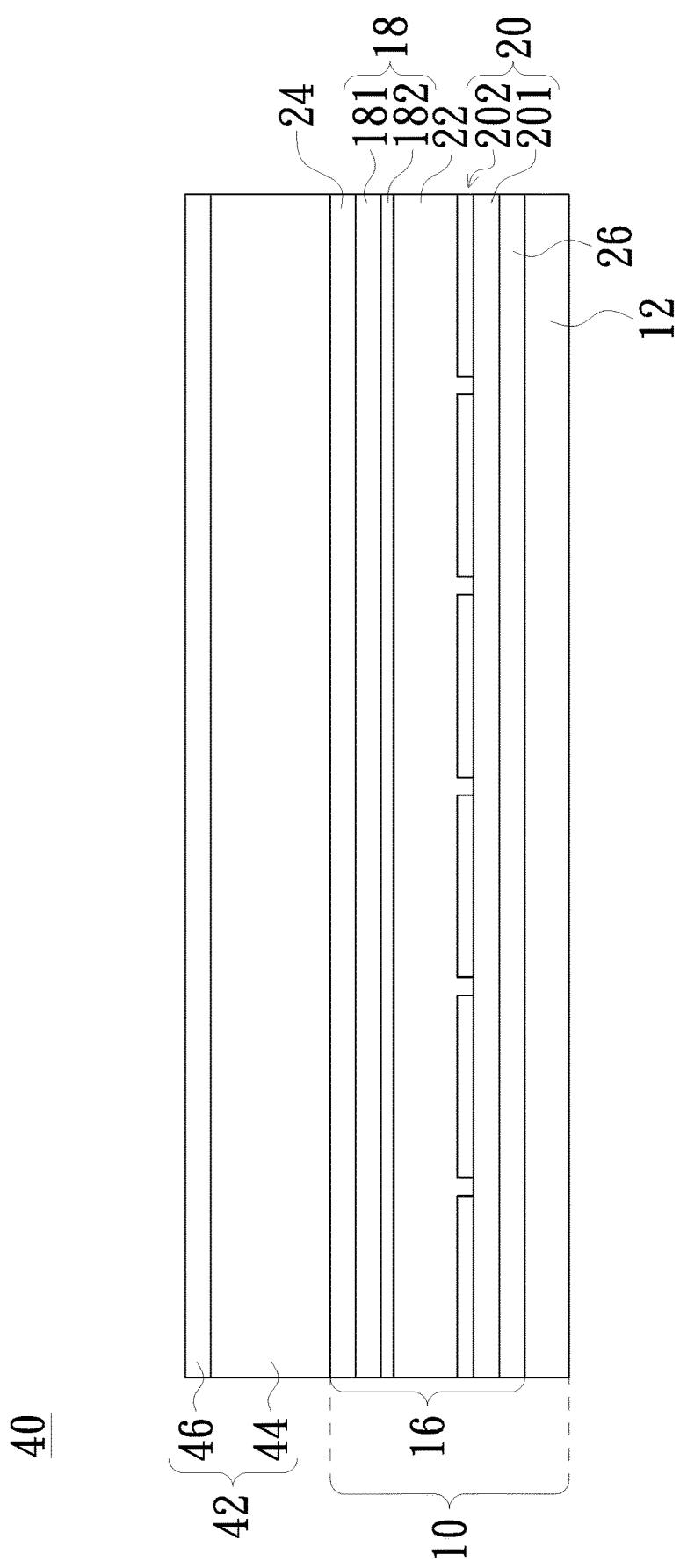
FIG. 8 is a schematic cross-sectional structural view of a display device according to a first embodiment of the invention.

FIG. 8 is a schematic cross-sectional structural view of a display device according to a first embodiment of the invention. As shown in the figure, the display device 40 includes a display panel 42 and the light source module 10 described above. The display panel 42 is disposed on the side of the dimming liquid crystal panel 16 away from the optical plate 12. In order to facilitate the description below, it is defined that the dimming liquid crystal panel 16 is disposed above the optical plate 12, and the display panel 42 is disposed above the dimming liquid crystal panel 16. In an embodiment, the first driving substrate 18 is disposed on the side of the liquid crystal material layer 22 away from the optical plate 12, and the second driving substrate 20 is disposed on the side of the liquid crystal material layer 22 adjacent to the optical plate 12. Therefore, the disposition of the dimming liquid crystal panel 16 sequentially from top to bottom is the first polarizer 24, the first driving substrate 18, the liquid crystal material layer 22, the second driving substrate 20 and the second polarizer 26. The first polarizer 24 is located between the display panel 42 and the first driving substrate 18, and the second polarizer 26 is located between the optical plate 12 and the second driving substrate 20. In an embodiment, the display panel 42 shares the first polarizer 24 of the dimming liquid crystal panel 16. The display panel 42 includes a panel module 44 and a third polarizer 46, and the third polarizer 46 is disposed on the side of the panel module 44 away from the dimming liquid crystal panel 16. As shown in FIG. 8, the third polarizer 46 is disposed above the panel module 44.

Figure 9:
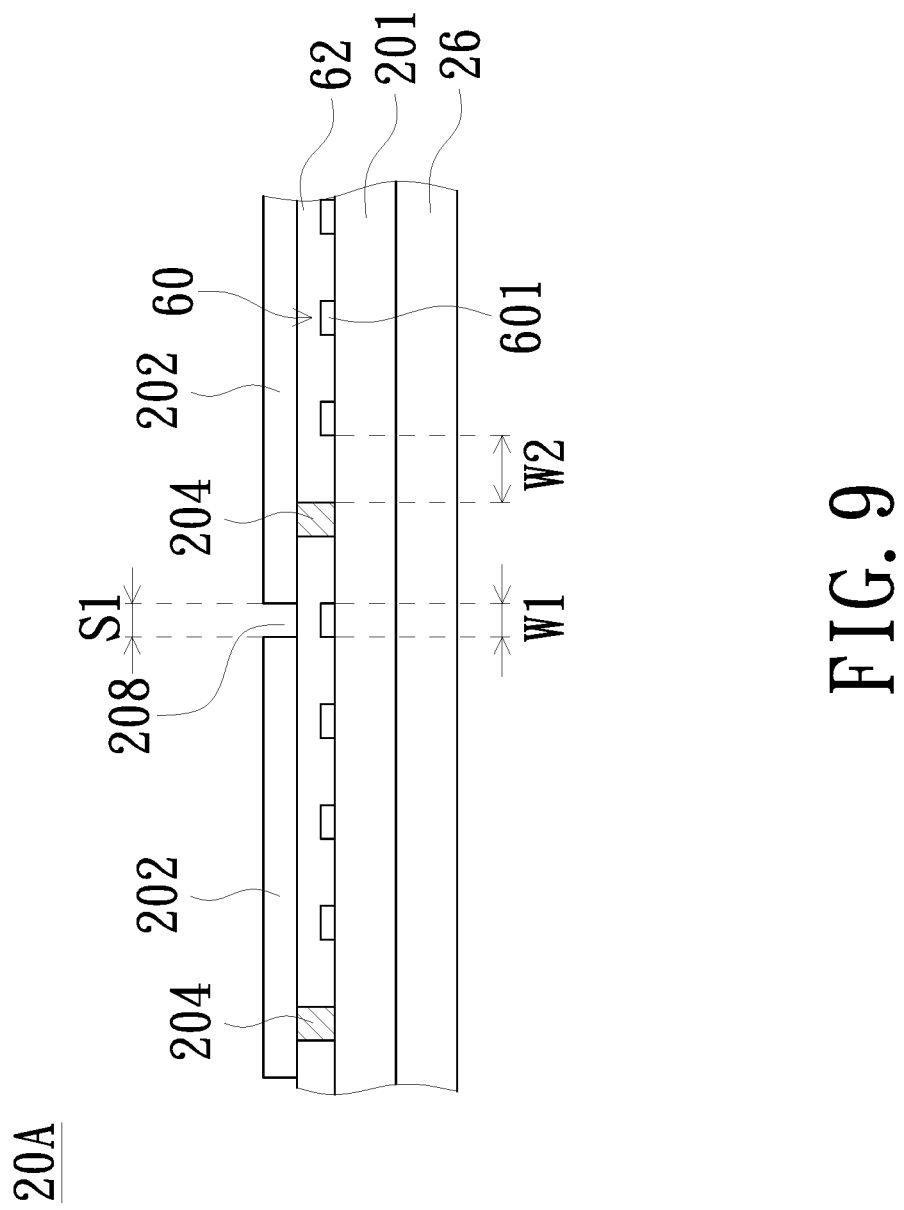
FIG. 9 is a schematic cross-sectional structural view of a second driving substrate according to another embodiment of the invention.
Figure 10:
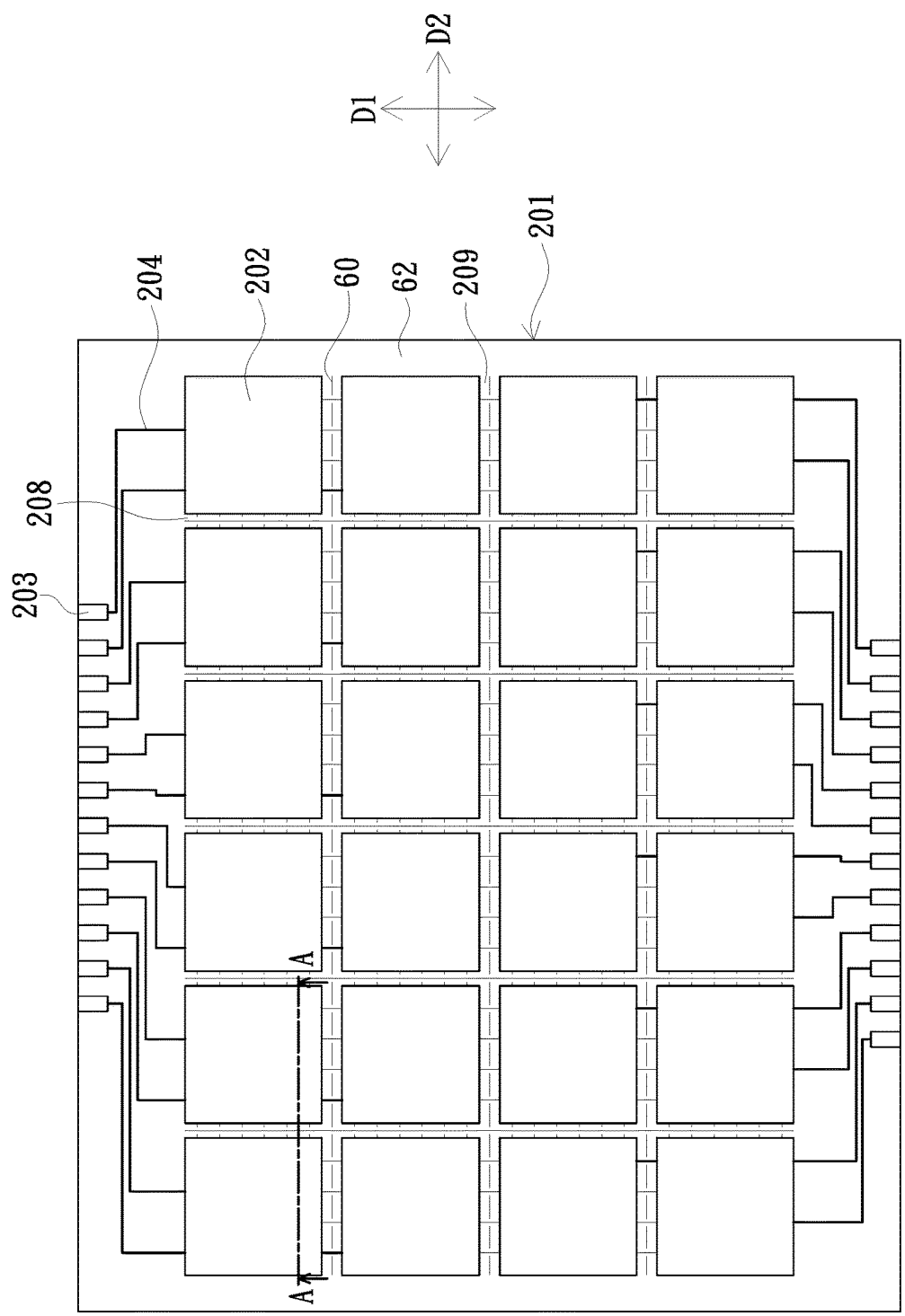
FIG. 10 is a schematic perspective top view of a second driving substrate according to another embodiment of the invention.

FIG. 9 is a schematic cross-sectional structural view of a second driving substrate according to another embodiment of the invention, and FIG. 10 is a schematic perspective top view of a second driving substrate according to another embodiment of the invention, wherein FIG. 9 is a schematic cross-sectional view along line A-A of FIG. 10.

As shown in FIG. 9 and FIG. 10, the second driving substrate 20A includes a second substrate 201, a plurality of independent electrodes 202, a plurality of first signal pads 203, a plurality of first wires 204, a plurality of dummy wires 60 and a first transparent insulation layer 62. As shown in FIG. 9, the first wires 204 and the dummy wires 60 are disposed on the second substrate 201 and covered by the first transparent insulation layer 62, wherein the first wires 204 are further exposed from the first transparent insulation layer 62. As shown in FIG. 10, the independent electrodes 202 are insulated from each other and disposed on the first transparent insulation layer 62, wherein the independent electrodes 202 overlap the first wires 204 and the dummy wires 60. The first signal pads 203 are disposed on at least one side of the second substrate 201, and each of the independent electrodes 202 is electrically connected to one of the first signal pads 203 via one of the first wires 204. In one embodiment, as shown in FIG. 10, the first signal pads 203 are, for example, disposed on two opposite sides (long sides) of the inner surface of the second substrate 201. Further, in one embodiment, the second substrate 201 is located between the second polarizer 26 (shown in FIG. 9) and the liquid crystal material layer 22 (shown in FIG. 5).

Figure 11:
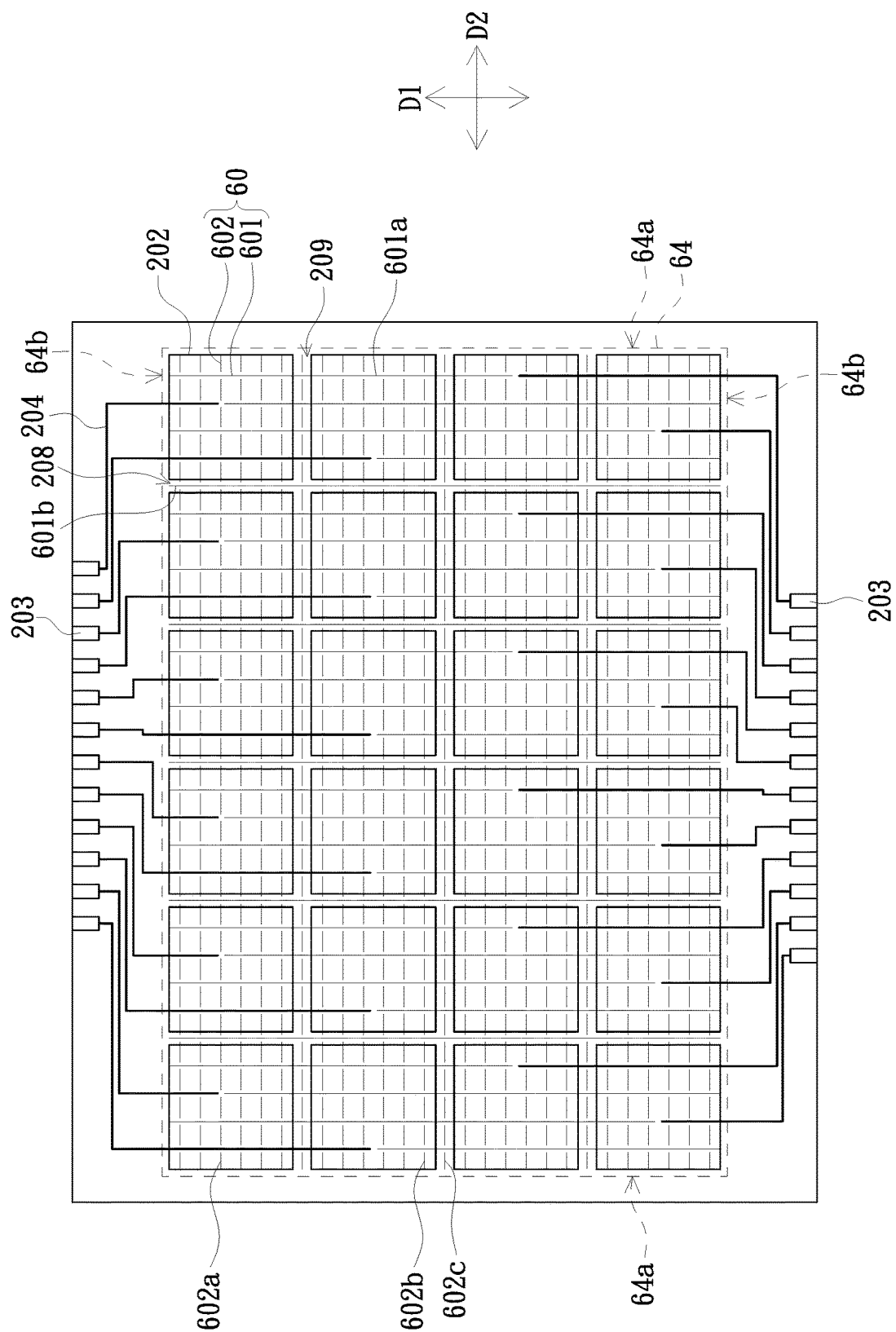
FIG. 11 is a schematic view of the arrangements of the independent electrodes, the first wires, and the dummy wires of a second driving substrate according to another embodiment of the invention.

FIG. 11 is a schematic view of the arrangements of the independent electrodes, the first wires, and the dummy wires of a second driving substrate according to another embodiment of the invention. As shown in FIG. 10 and FIG. 11, in one embodiment, the independent electrodes 202 are arranged, for example, in a matrix, and a plurality of first intervals 208 extended in a first direction D1 and a plurality of second intervals 209 extended in a second direction D2 crossing with the first direction D1 are formed between the independent electrodes 202.

As shown in FIG. 11, in one embodiment, the portion of each first wire 204 overlapped with one or more independent electrodes 202 is extended in the first direction D1. In one embodiment, the independent electrodes 202 are defined in a display area 64 having opposite first sides 64a and opposite second sides 64b, wherein the opposite first sides 64a (for example, the short sides) are along the first direction D1 and the opposite second sides 64b (for example, the long sides) are along the second direction D2. In one embodiment, the first signal pads 203 are adjacent the opposite second sides 64b.

The dummy wires 60 include a plurality of first dummy wires 601 and a plurality of second dummy wires 602. The first dummy wires 601 are extended in the first direction D1 and are equidistantly arranged, wherein at least one end of each first dummy wire 601 roughly extends to at least one second side 64b of the display area 64. The second dummy wires 602 are extended in the second direction D2 and are equidistantly arranged, wherein two ends of each second dummy wire 602 respectively roughly extend to the two first sides 64a of the display area 64.

In one embodiment, among the first dummy wires 601, portions of the first dummy wires, labeled as 601a, are aligned but disconnected with the first wires 204, and another portion of the first dummy wires, labeled as 601b, are overlapped with the first intervals 208. In another embodiment, there may be portions of the first dummy wires 601 disposed between the first wires 204 and overlapped with the independent electrodes 202.

Continued from the above description, among the second dummy wires 602, portions of the second dummy wires, labeled as 602a, are crossed but disconnected with the first wires 204, portions of the second dummy wires, labeled as 602b, are crossed but disconnected with the first dummy wires 601, and another portion of the second dummy wires, labeled as 602c are overlapped with the second intervals 209. In another embodiment, the second dummy wires 602 may be crossed and connected with the first dummy wires 601. The distributions of the first dummy wires 601 and the second dummy wires 602 may make displayed image be more natural and achieve the effect of visual balance.

As shown in FIG. 9, a width W1 of each of the first dummy wires 601 is greater than or equal to a width Si of each of the first intervals 208, and a width (not be labeled) of each of the second dummy wires 602 is greater than or equal to a width (not be labeled) of each of the second intervals 209. In one embodiment, the width Si of each first interval 208 and the width of each second interval 209 are between 2 and 50 μm, and the preferred widths are between 5±3 μm. The width W1 of each first dummy wire 601 and the width of each second dummy wire 602 are between 2 and 50 μm, and the preferred widths are 5±3 μm. A width W2 between the adjacent first dummy wires 601 and/or between the adjacent second dummy wires 602 are below 200 μm, and the preferred width W2 is between 100 μm and 150 μm. Further, FIGS. 10 and 11 are only used to illustrate the relative positional relationship of each element, not to limit the relative width relationship between dummy line and interval.

Figure 12:
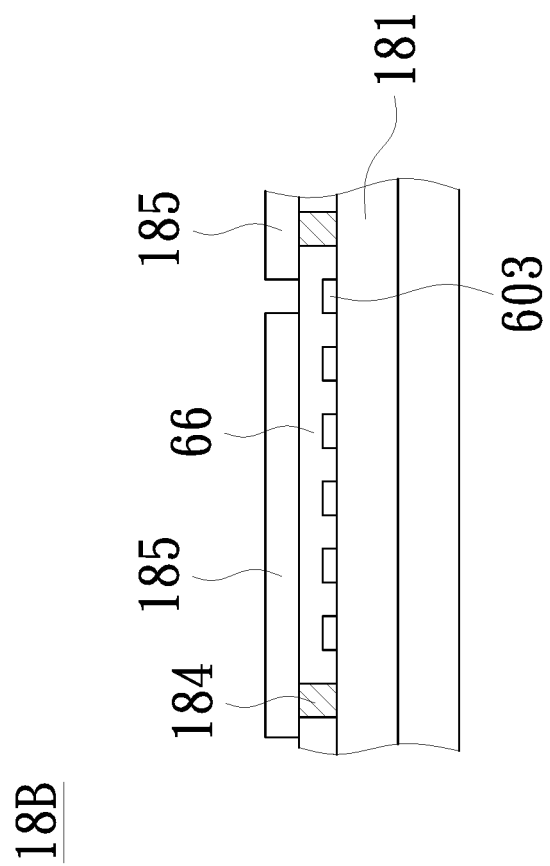
FIG. 12 is a schematic cross-sectional structural view of a first driving substrate according to another embodiment of the invention.
Figure 13:
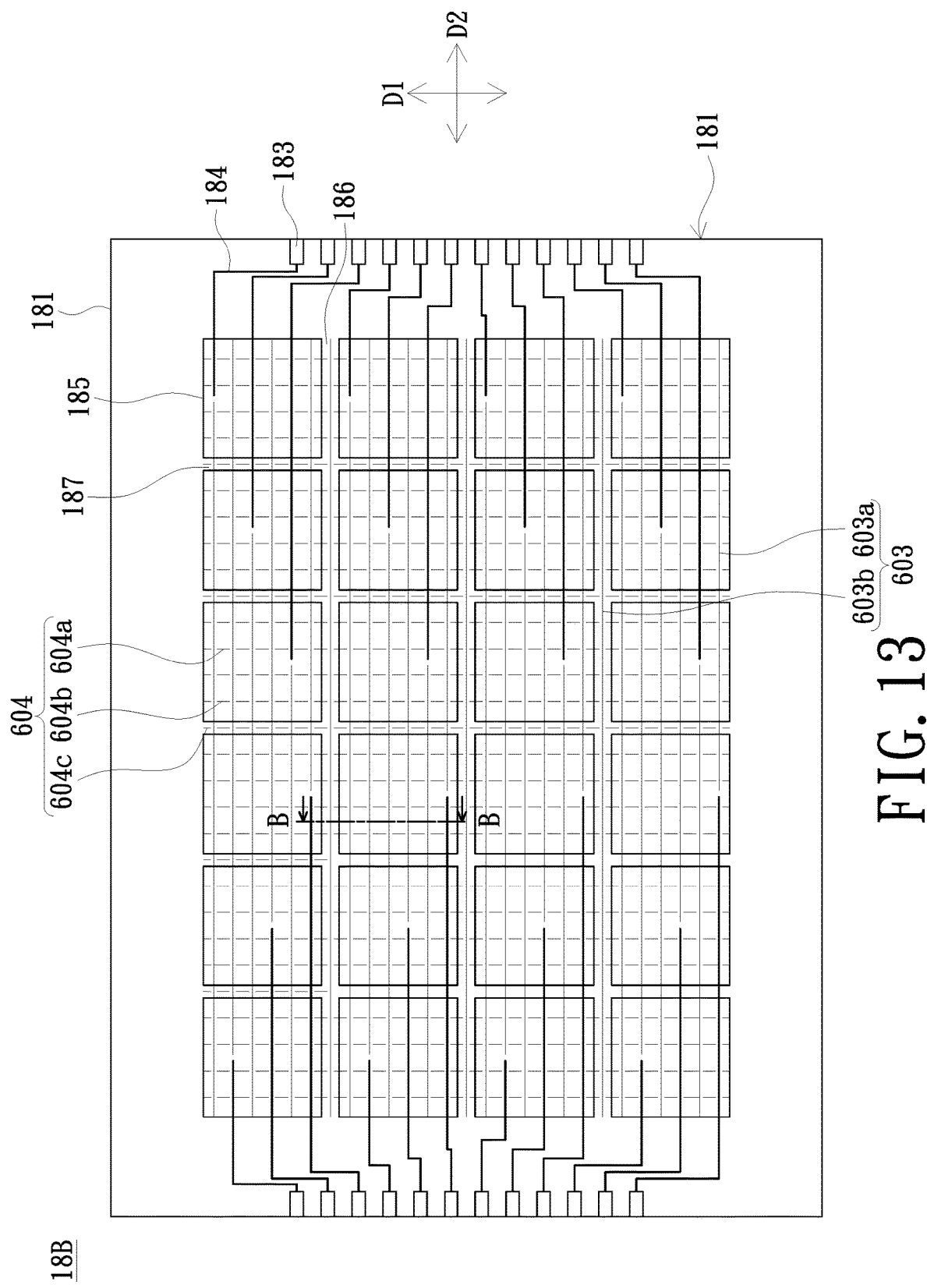
FIG. 13 is a schematic view of the arrangements of the independent sub-electrodes, the second wires, and the dummy wires of a first driving substrate according to another embodiment of the invention.

FIG. 12 is a schematic cross-sectional structural view of a first driving substrate according to another embodiment of the invention, and FIG. 13 is a schematic view of the arrangements of the independent sub-electrodes, the second wires, and the dummy wires shown of a first driving substrate according to another embodiment of the invention. FIG. 12 is a schematic cross-sectional view along line B-B of FIG. 13.

As shown in FIG. 12 and FIG. 13, the structure of the first driving substrate 18B is similar with the structure of the second driving plate 20A. The first driving substrate 18B includes a first substrate 181, a plurality of independent sub-electrodes 185, a plurality of second signal pads 183, a plurality of second wires 184, a plurality of third dummy wires 603, a plurality of fourth dummy wires 604 and a second transparent insulation layer 66. As shown in FIG. 12, the second wires 184, the third dummy wires 603 and the fourth dummy wires 604 are disposed on the first substrate 181 and covered by the second transparent insulation layer 66, and the second wires 184 are further exposed from the second transparent insulation layer 66. In one embodiment, the independent sub-electrodes 185 are overlapped with the second wires 184, the third dummy wires 603 and the fourth dummy wires 604.

Continued from the above description, the independent sub-electrodes 185 are insulated from each other and disposed on the second transparent insulation layer 66. In one embodiment, the independent sub-electrodes 185 are arranged, for example, in a matrix, and a plurality of third intervals 186 extended in a second direction D2 and a plurality of fourth intervals 187 extended in a first direction D1 crossing with the second direction D2 are formed between the independent sub-electrodes 185. The second signal pads 183 are disposed on at least one side of the first substrate 181, and each of the independent sub-electrodes 185 is electrically connected to one of the second signal pads 183 via one of the second wires 184. In one embodiment, as shown in FIG. 13, the second signal pads 183 are, for example, disposed on two opposite sides (short sides) of the inner surface of the first substrate 181, and portion of each second wire 184 overlapped with one or more independent sub-electrodes 185 is extended in the second direction D2.

In one embodiment, as shown in FIG. 13, the third dummy wires 603 are extended in the second direction D2 and are equidistantly arranged. Portions of the third dummy wires, labeled as 603*a*, are aligned but disconnected with the second wires 184, and another portion of the third dummy wires, labeled as 603*b*, are overlapped with the third intervals 186. In another embodiment, there may be portions of the third dummy wires 603 disposed between the second wires 184 and overlapped with the independent sub-electrodes 185.

Continued from the above description, the fourth dummy wires 604 are extended in the first direction D1 and are equidistantly arranged. Portions of the fourth dummy wires, labeled as 604*a*, are crossed but disconnected with the second wires 184, portion of fourth dummy wires, labeled as 604*b*, are crossed but disconnected with the third dummy wires 603, and another portion of the fourth dummy wires, labeled as 604*c*, are overlapped with the fourth intervals 187. In another embodiment, the fourth dummy wires 604*b*/604*c* may be crossed and connected with the third dummy wires 603.

In one embodiment, the third dummy wires 603 of the first driving substrate 18B may correspond to the second dummy wires 602 of the second driving substrate 20A, and/or the fourth dummy wires 604 of the first driving substrate 18B may correspond to the first dummy wires 601 of the second driving substrate 20A. In another embodiment, the third dummy wires 603 of the first driving substrate 18B and the second dummy wires 602 of the second driving substrate 20A may be alternately arranged periodically, and/or the fourth dummy wires 604 of the first driving substrate 18B and the first dummy wires 601 of the second driving substrate 20A may be alternately arranged periodically. Further, FIG. 13 is only used to illustrate the relative positional relationship of each element, not to limit the relative width relationship between dummy line and interval.

Figure 14A:
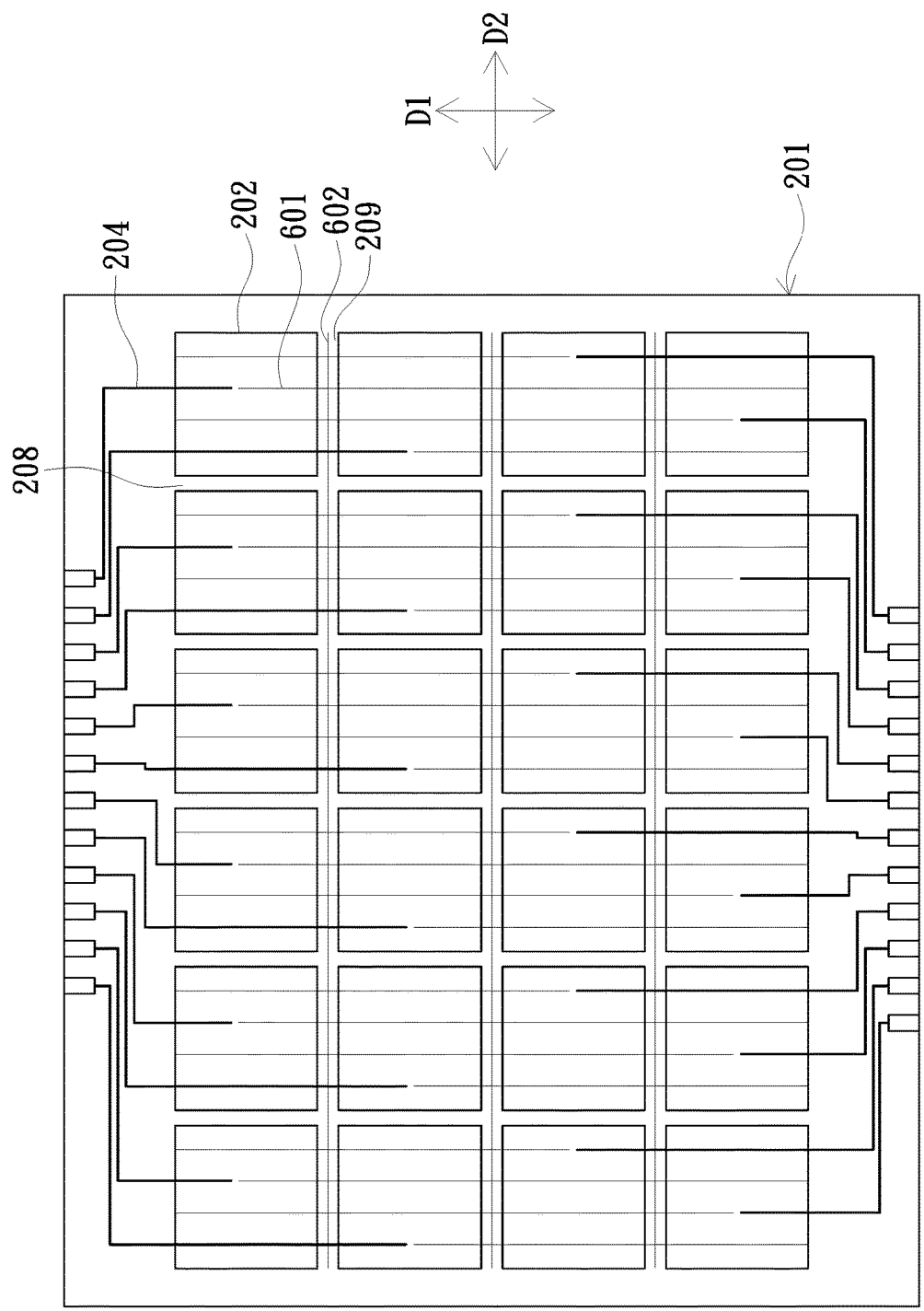
FIGS. 14A and 14B are respectively schematic structural views of a second driving substrate and a first driving substrate according to another embodiment of the invention.
Figure 14B:
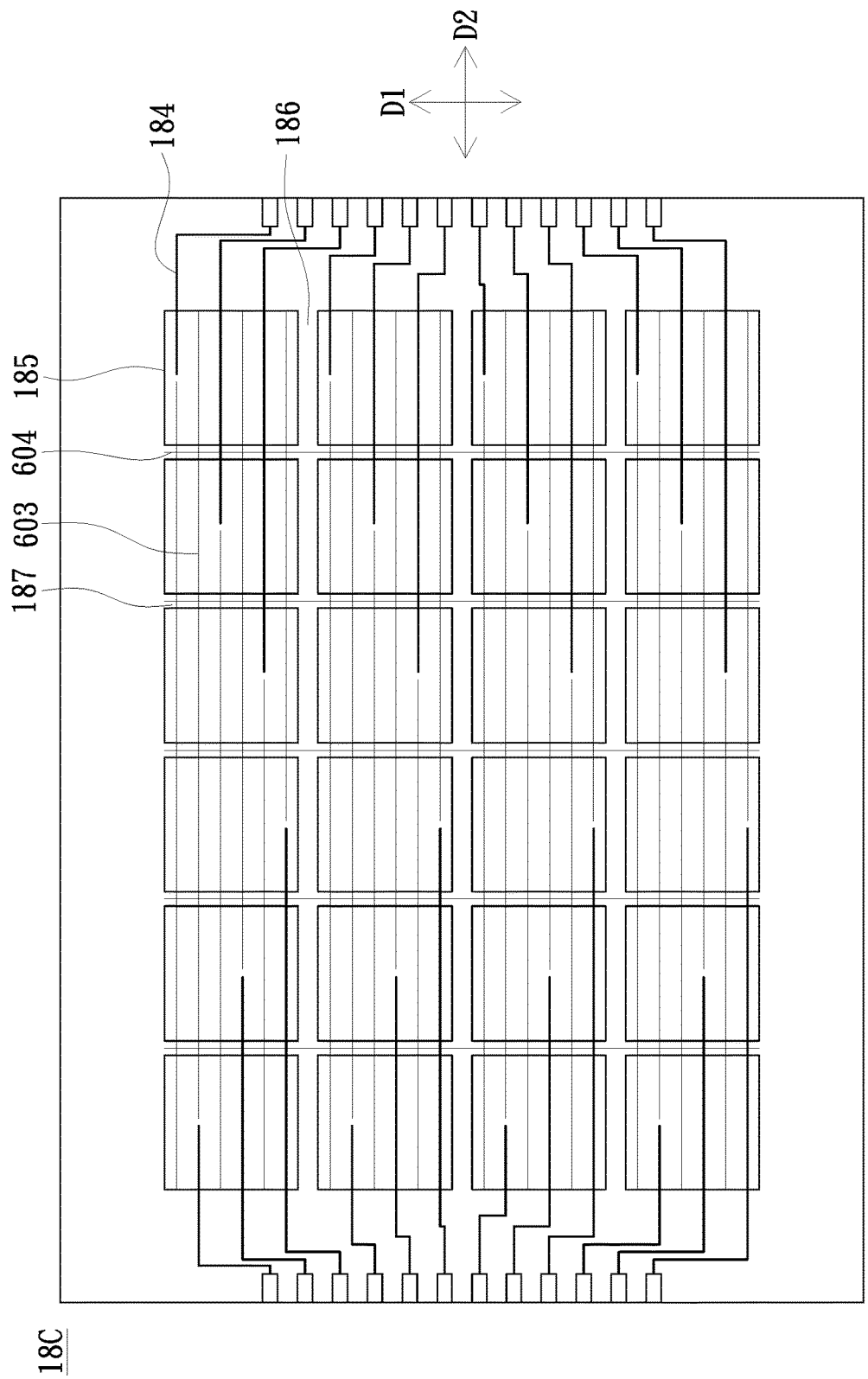

FIGS. 14A and 14B are respectively schematic structural views of a second driving substrate and a first driving substrate according to another embodiment of the invention. As shown in FIG. 14A and FIG. 14B, the arrangements of the independent electrodes 202 and the first wires 204 of the second driving substrate 20B are similar or the same with the embodiment shown in FIG. 11, and the arrangements of the independent sub-electrodes 185 and the second wires 184 of the first driving substrate 18C are similar or the same with embodiment shown in FIG. 13, hence the details will not be repeated here. As shown in FIG. 14A, a plurality of first dummy wires 601 are extended in the first direction D1 and a plurality of second dummy wires 602 are extended in the second direction D2, and as shown in FIG. 14B, the fourth dummy wires 604 are extended in the first direction D1, and the third dummy wires 603 are extended in the second direction D2, wherein the first dummy wires 601 and the fourth dummy wires 604 do not overlap with each other, and the second dummy wires 602 and the third dummy wires 603 do not overlap with each other.

Continued from the above description, in one embodiment, as shown in FIG. 14A and FIG. 14B, the second dummy wires 602 of the second driving substrate 20B only overlap the second intervals 209, and the third dummy wires 603 of the first driving substrate 18C only overlap the independent sub-electrodes 185 without overlapping third intervals 186, but the second dummy wires 602 and orthogonal projections of third dummy wires 603 projected on the second substrate 201 are equidistantly arranged. In another embodiment, the second dummy wires 602 and orthogonal projections of third dummy wires 603 projected on the second substrate 201 may be alternately arranged.

Further, in one embodiment, as shown in FIG. 14A and FIG. 14B, the first dummy wires 601 of the second driving substrate 20B only overlap the independent electrodes 202 without overlapping the first intervals 208, and the fourth dummy wires 604 of the first driving substrate 18C only overlap fourth intervals 187, but the first dummy wires 601 and orthogonal projections of the fourth dummy wires 604 projected on the second substrate 201 are equidistantly arranged. In another embodiment, the first dummy wires and orthogonal projections of fourth dummy wires 604 projected on the second substrate 201 may be alternately arranged.

In one embodiment, materials of the independent electrodes 202, the independent sub-electrodes 185, the first wires 204, the second wires 184, the first dummy wires 601, the second dummy wires 602, the third dummy wires 603, the fourth dummy wires 604, the first signal pads 203 and the second signal pads 183 are transparent conductive materials. In another embodiment, material of the independent electrodes 202 and the independent sub-electrodes 185 is a transparent conductive material, and materials of the first signal pads 203, the second signal pads 183, the first dummy wires 601, the second dummy wires 602, the third dummy wires 603, the fourth dummy wires 604, the first wires 204, and the second wires 184 are metal materials.

Figure 15:
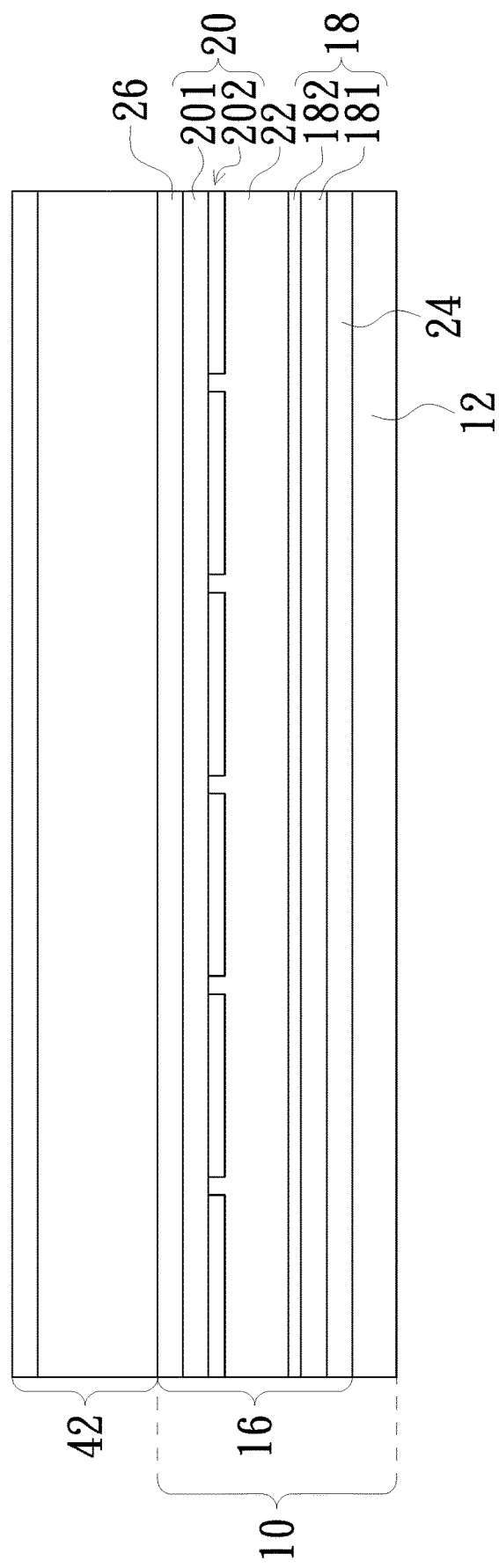
FIG. 15 is a schematic cross-sectional structural view of a display device according to a second embodiment of the invention.

In the above first embodiment, the first driving substrate 18 is disposed on the side of the liquid crystal material layer 22 away from the optical plate 12, and the second driving substrate 20 is disposed on the side of the liquid crystal material layer 22 adjacent to the optical plate 12, that is, the first driving substrate 18 having the common electrode 182 is disposed above the liquid crystal material layer 22, and the second driving substrate 20 having the independent electrode 202 is disposed below the liquid crystal material layer 22, but are not limited thereto. FIG. 15 is a schematic cross-sectional structural view of a display device according to a second embodiment of the invention. As shown in FIG. 9, the second driving substrate 20 is disposed on the side of the liquid crystal material layer 22 away from the optical plate 12, and the first driving substrate 18 is disposed on the side of the liquid crystal material layer 22 adjacent to the optical plate 12, that is, the second driving substrate 20 having the independent electrode 202 is disposed above the liquid crystal material layer 22, the second polarizer 26 is located between the display panel 42 and the second driving substrate 20, the first driving substrate 18 having the common electrode 182 is disposed below the liquid crystal material layer 22, and the first polarizer 24 is located between the first driving substrate 18 and the optical plate 12.

Figure 16:
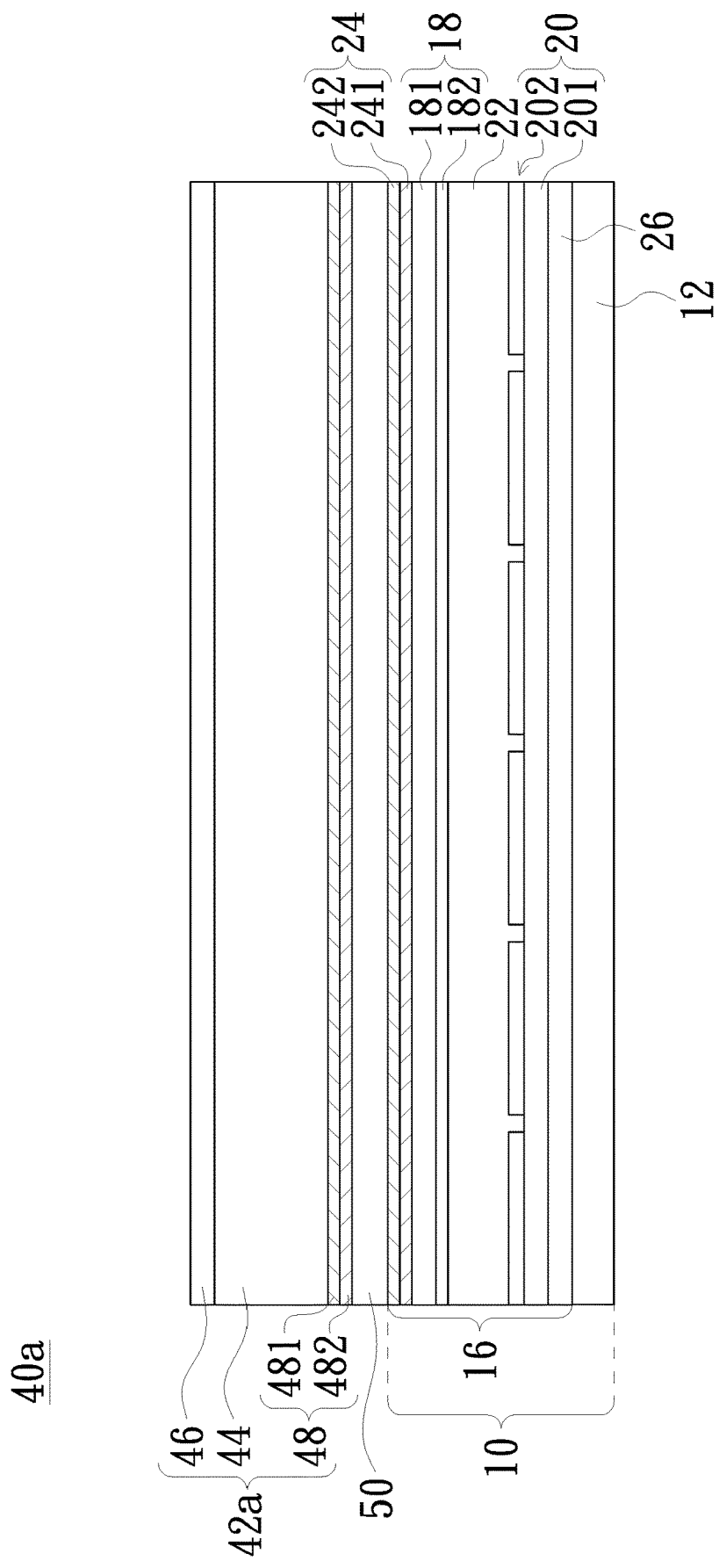
FIG. 16 is a schematic cross-sectional structural view of a display device according to a third embodiment of the invention.

FIG. 16 is a schematic cross-sectional structural view of a display device according to a third embodiment of the invention. As shown in the figure, the display device 40*a* includes a display panel 42a and the light source module 10 described above. The display panel 42a is disposed on the side of the dimming liquid crystal panel 16 away from the optical plate 12. Different from the display device 40 of the first embodiment and the second embodiment, in the display device 40a of the third embodiment, the display panel 42a includes the panel module 44, the third polarizer 46 and a fourth polarizer 48. The third polarizer 46 is disposed on the side of the panel module 44 away from the dimming liquid crystal panel 16, for example, the third polarizer 46 is disposed above the panel module 44. The fourth polarizer 48 is disposed on the side of the panel module 44 facing the dimming liquid crystal panel 16, for example, the fourth polarizer 48 is disposed below the panel module 44. In an embodiment, if the dimming liquid crystal panel 16 is configured such that the first driving substrate 18 is disposed above the liquid crystal material layer 22 and the second driving substrate 20 is disposed below the liquid crystal material layer 22, then the fourth polarizer 48 of the display panel 42 is opposite to the first polarizer 24.

Following the above description, the display device 40a further includes a diffusion plate 50 disposed between the dimming liquid crystal panel 16 and the display panel 42a. In the third embodiment as shown in FIG. 10, the diffusion plate 50 is disposed between the first polarizer 24 and the fourth polarizer 48. The first polarizer 24 includes a first absorption-type polarizing layer 241 and a first reflection-type polarizing layer 242, and the fourth polarizer 48 includes a fourth absorption-type polarizing layer 481 and a fourth reflection-type polarizing layer 482. In an embodiment, the fourth reflection-type polarizing layer 482 and the first reflection-type polarizing layer 242 are located between the fourth absorption-type polarizing layer 481 and the first absorption-type polarizing layer 241, that is, the fourth reflection-type polarizing layer 482 and the first reflection-type polarizing layer 242 face each other, and the diffusion plate 50 is disposed between the fourth reflection-type polarizing layer 482 and the first reflection-type polarizing layer 242. The diffusion plate 50 is a low-haze diffusion plate, and the edges of the partition areas 28 of the dimming liquid crystal panel 16 (shown in FIG. 4) are obscured by having the light reflected back and forth between the fourth reflection-type polarizing layer 482 and the first reflection-type polarizing layer 242. The first reflection-type polarizing layer 242 and the fourth reflection-type polarizing layer 482 are, for example, an advanced polarization conversion film (APCF) or a dual brightness enhancement film (DBEF).

Figure 17:
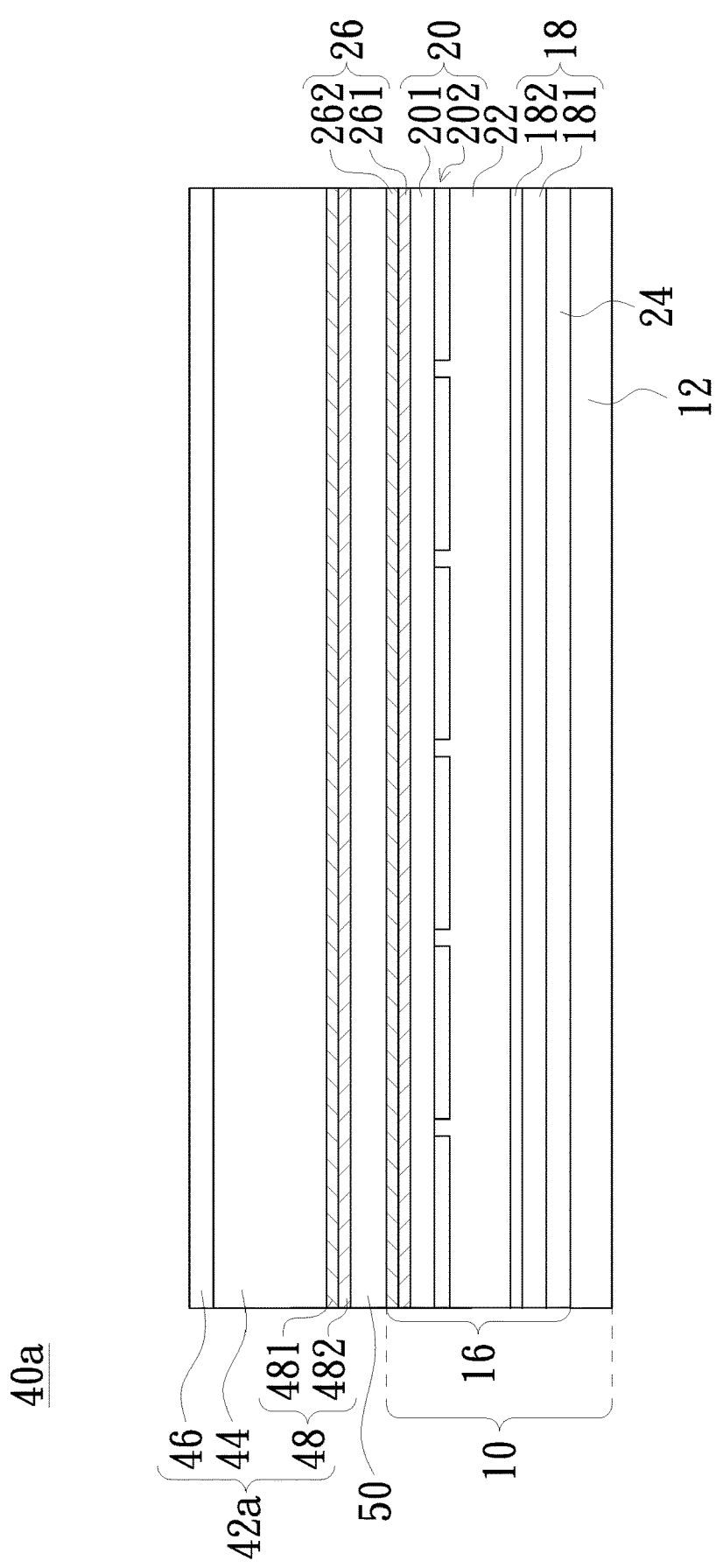
FIG. 17 is a schematic cross-sectional structural view of a display device according to a fourth embodiment of the invention.

FIG. 17 is a schematic cross-sectional structural view of a display device according to a fourth embodiment of the invention. As shown in the figure, the difference from the third embodiment described above lies in that in the dimming liquid crystal panel 16, the second driving substrate 20 is disposed above the liquid crystal material layer 22 and the first driving substrate 18 is disposed below the liquid crystal material layer 22, the fourth polarizer 48 of the display panel 42a is disposed opposite to the second polarizer 26, and the diffusion plate 50 is disposed between the second polarizer 26 and the fourth polarizer 48. The second polarizer 26 includes a second absorption-type polarizing layer 261 and a second reflection-type polarizing layer 262. The fourth polarizer 48 includes a fourth absorption-type polarizing layer 481 and a fourth reflection-type polarizing layer 482. The diffusion plate 50 is disposed between the fourth reflection-type polarizing layer 482 and the second reflection-type polarizing layer 262.

In summary, the invention can achieve the following effects:

1. When the light source module of the embodiment is used as a backlight module, the light from the light source and directed to the dimming liquid crystal panel via the optical plate achieves local dimming through the dimming liquid crystal panel, and therefore replacing the direct-type backlight module that needs to use a plurality of LEDs to achieve local dimming. Thus, the number of LEDs being used can greatly reduce and the manufacturing cost of the backlight module is reduced.

2. The use of a light source module as a backlight module instead of a direct-type backlight module improves the lack of the light mixing distance cannot be shortened due to the number of LEDs used (cost consideration) and the thickness of the backlight module cannot be reduced.

3. The display device of the embodiment can enhance the contrast of the display screen by means of local dimming of the light source module.

4. The distributions of the dummy wires may achieve the effect of visual balance.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first substrate, the second substrate, the first signal pad, the second signal pad, the first wire, the second wire, the first transparent insulation layer, the second transparent insulation layer, the first polarizer, the second polarizer, the first direction, the second direction, the first interval, the second interval, the first polarizing layer and the second polarizing layer are only used for distinguishing various elements and do not limit the number of the elements.

What is claimed is:

1. A light source module, comprising:
an optical plate, having a light incident surface and a light exit surface;
a light source, disposed beside the light incident surface; and
a dimming liquid crystal panel, disposed opposite to the light exit surface and comprising a first driving substrate, a second driving substrate and a liquid crystal material layer disposed between the first driving substrate and the second driving substrate, wherein,
the first driving substrate comprises a first substrate and a common electrode disposed on the first substrate;
the second driving substrate comprises a second substrate, a plurality of independent electrodes, a plurality of first signal pads, a plurality of first wires, a plurality of dummy wires and a first transparent insulation layer, wherein the first wires and the dummy wires are disposed on the second substrate and covered by the first transparent insulation layer, the first wires are further exposed from the first transparent insulation layer, the independent electrodes are insulated from each other and disposed on the first transparent insulation layer, the independent electrodes overlap the first wires and the dummy wires, the first signal pads are disposed on at least one side of the second substrate, and each of the independent electrodes is electrically connected to one of the first signal pads via one of the first wires,
wherein the first driving substrate further comprises a plurality of second signal pads, a plurality of second wires, a plurality of third dummy wires, a plurality of fourth dummy wires and a second transparent insulation layer, wherein the second wires, the third dummy wires and the fourth dummy wires are disposed on the first substrate and covered by the second transparent insulation layer, the second wires are further exposed from the second transparent insulation layer,
wherein the common electrode comprises a plurality of independent sub-electrodes, the independent sub-electrodes are insulated from each other and disposed on the second transparent insulation layer, the independent sub-electrodes overlap the second wires, the third dummy wires and the fourth dummy wires, the second signal pads are disposed on at least one side of the first substrate, and each of the independent sub-electrodes is electrically connected to one of the second signal pads via one of the second wires,
wherein the independent sub-electrodes are arranged in a matrix, and a plurality of third intervals extended in a second direction and a plurality of fourth intervals extended in a first direction crossing with the second direction are formed between the independent sub-electrodes, wherein portions of the second wires overlapped with the independent sub-electrodes are extended in the second direction,
wherein the third dummy wires are extended in the second direction and equidistantly arranged, portions of the third dummy wires are aligned but disconnected with the second wires, portions of the third dummy wires are disposed between the second wires and overlapped with the independent sub-electrodes, another portion of the third dummy wires are overlapped with the third intervals.

2. The light source module according to claim 1, wherein the independent electrodes are arranged in a matrix, and a plurality of first intervals extended in a first direction and a plurality of second intervals extended in a second direction crossing with the first direction are formed between the independent electrodes.

3. The light source module according to claim 2, wherein portions of the first wires overlapped with the independent electrodes are extended in the first direction, the dummy wires comprise a plurality of first dummy wires extended in the first direction, the first dummy wires are equidistantly arranged, portions of the first dummy wires are aligned but disconnected with the first wires, another portion of the first dummy wires are overlapped with the first intervals.

4. The light source module according to claim 3, wherein a width of each of the first dummy wires is greater than or equal to a width of each of the first intervals.

5. The light source module according to claim 3, wherein the dummy wires further comprise a plurality of second dummy wires extended in the second direction, the second dummy wires are equidistantly arranged, portions of the second dummy wires are crossed but disconnected with the first wires, another portion of the second dummy wires are overlapped with the second intervals.

6. The light source module according to claim 5, wherein a width of each of the second dummy wires is greater than or equal to a width of each of the second intervals.

7. The light source module according to claim 5, wherein the second dummy wires are crossed but disconnected with the first dummy wires.

8. The light source module according to claim 1, wherein the dimming liquid crystal panel further comprises a first polarizer and a second polarizer,
the first substrate is located between the first polarizer and the liquid crystal material layer, and the first polarizer comprises at least one of a first absorption-type polarizing layer and a first reflection-type polarizing layer; and
the second substrate is located between the second polarizer and the liquid crystal material layer, and the second polarizer comprises at least one of a second absorption-type polarizing layer and a second reflection-type polarizing layer.

9. The light source module according to claim 1, wherein materials of the independent electrodes, the first wires, the dummy wires, and the first signal pads are transparent conductive materials.

10. The light source module according to claim 1, wherein a material of the independent electrodes is a transparent conductive material, and materials of the first signal pads, the dummy wires and the first wires are metal materials.

11. The light source module according to claim 1, wherein the first signal pads are disposed on two opposite sides of the second substrate.

12. The light source module according to claim 1, wherein the dummy wires comprises a plurality of first dummy wires extended in the first direction and a plurality of second dummy wires extended in the second direction, the fourth dummy wires are extended in the first direction, and the third dummy wires are extended in the second direction, wherein the first dummy wires and the fourth dummy wires do not overlap with each other, and the second dummy wires and the third dummy wires do not overlap with each other.

13. The light source module according to claim 12, wherein the first dummy wires and orthogonal projections of the fourth dummy wires projected on the second substrate are equidistantly and alternately arranged, and the second dummy wires and orthogonal projections of third dummy wires projected on the second substrate are equidistantly and alternately arranged.

14. A light source module, comprising:
an optical plate, having a light incident surface and a light exit surface;
a light source, disposed beside the light incident surface; and
a dimming liquid crystal panel, disposed opposite to the light exit surface and comprising a first driving substrate, a second driving substrate and a liquid crystal material layer disposed between the first driving substrate and the second driving substrate, wherein,
the first driving substrate comprises a first substrate and a common electrode disposed on the first substrate;
the second driving substrate comprises a second substrate, a plurality of independent electrodes, a plurality of first signal pads, a plurality of first wires, a plurality of dummy wires and a first transparent insulation layer, wherein the first wires and the dummy wires are disposed on the second substrate and covered by the first transparent insulation layer, the first wires are further exposed from the first transparent insulation layer, the independent electrodes are insulated from each other and disposed on the first transparent insulation layer, the independent electrodes overlap the first wires and the dummy wires, the first signal pads are disposed on at least one side of the second substrate, and each of the independent electrodes is electrically connected to one of the first signal pads via one of the first wires,
wherein the first driving substrate further comprises a plurality of second signal pads, a plurality of second wires, a plurality of third dummy wires, a plurality of fourth dummy wires and a second transparent insulation layer, wherein the second wires, the third dummy wires and the fourth dummy wires are disposed on the first substrate and covered by the second transparent insulation layer, the second wires are further exposed from the second transparent insulation layer,
wherein the common electrode comprises a plurality of independent sub-electrodes, the independent sub-electrodes are insulated from each other and disposed on the second transparent insulation layer, the independent sub-electrodes overlap the second wires, the third dummy wires and the fourth the dummy wires, the second signal pads are disposed on at least one side of the first substrate, and each of the independent sub-electrodes is electrically connected to one of the second signal pads via one of the second wires,
wherein the independent sub-electrodes are arranged in a matrix, and a plurality of third intervals extended in a second direction and a plurality of fourth intervals extended in a first direction crossing with the second direction are formed between the independent sub-electrodes, wherein portions of the second wires overlapped with the independent sub-electrodes are extended in the second direction,
wherein the fourth dummy wires are extended in the first direction and equidistantly arranged, portions of the fourth dummy wires are crossed but disconnected with the second wires, another portion of the fourth dummy wires are overlapped with the fourth intervals.

15. The light source module according to claim 14, wherein the fourth dummy wires are crossed but disconnected with the third dummy wires.

16. A display device, comprising a light source module and a display panel, and
the light source module comprising:
an optical plate, having a light incident surface and a light exit surface;
a light source, disposed beside the light incident surface; and
a dimming liquid crystal panel, disposed opposite to the light exit surface and comprising a first driving substrate, a second driving substrate and a liquid crystal material layer disposed between the first driving substrate and the second driving substrate, wherein, the first driving substrate comprises a first substrate and a common electrode disposed on the first substrate; and
the second driving substrate is disposed opposite to the first driving substrate and comprises a plurality of independent electrodes, a plurality of first signal pads, a plurality of first wires, a plurality of dummy wires and a first transparent insulation layer, wherein the first wires and the dummy wires are disposed on the second substrate and covered by the first transparent insulation layer, the first wires are further exposed from the first transparent insulation layer, the independent electrodes are insulated from each other and disposed on the first transparent insulation layer, the independent electrodes overlap the first wires and the dummy wires, the first signal pads are disposed on at least one side of the second substrate, and each of the independent electrodes is electrically connected to one of the first signal pads via one of the first wires,
wherein the first driving substrate further comprises a plurality of second signal pads, a plurality of second wires, a plurality of third dummy wires, a plurality of fourth dummy wires and a second transparent insulation layer, wherein the second wires, the third dummy wires and the fourth dummy wires are disposed on the first substrate and covered by the second transparent insulation layer, the second wires are further exposed from the second transparent insulation layer,
wherein the common electrode comprises a plurality of independent sub-electrodes, the independent sub-electrodes are insulated from each other and disposed on the second transparent insulation layer, the independent sub-electrodes overlap the second wires, the third dummy wires and the fourth the dummy wires, the second signal pads are disposed on at least one side of the first substrate, and each of the independent sub-electrodes is electrically connected to one of the second signal pads via one of the second wires,
wherein the independent sub-electrodes are arranged in a matrix, and a plurality of third intervals extended in a second direction and a plurality of fourth intervals extended in a first direction crossing with the second direction are formed between the independent sub-electrodes, wherein portions of the second wires overlapped with the independent sub-electrodes are extended in the second direction, wherein the third dummy wires are extended in the second direction and equidistantly arranged, portions of the third dummy wires are aligned but disconnected with the second wires, portions of the third dummy wires are disposed between the second wires and overlapped with the independent sub-electrodes, another portion of the third dummy wires are overlapped with the third intervals, wherein the display panel is disposed on a side of the dimming liquid crystal panel away from the optical plate.

\* \* \* \* \*